United States Patent
Chen

(10) Patent No.: US 10,225,862 B2
(45) Date of Patent: Mar. 5, 2019

(54) BASE STATION AND METHOD FOR DETERMINING UNLICENSED FREQUENCY CANDIDATE

(71) Applicant: FUJITSU LIMITED, Kawasaki-shi, Kanagawa (JP)

(72) Inventor: Hongyang Chen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/617,723

(22) Filed: Jun. 8, 2017

(65) Prior Publication Data

US 2017/0273110 A1 Sep. 21, 2017

Related U.S. Application Data

(63) Continuation of application No. PCT/JP2015/052230, filed on Jan. 27, 2015.

(51) Int. Cl.
*H04W 28/18* (2009.01)
*H04W 74/08* (2009.01)
(Continued)

(52) U.S. Cl.
CPC ......... *H04W 74/0808* (2013.01); *H04W 4/70* (2018.02); *H04W 16/14* (2013.01);
(Continued)

(58) Field of Classification Search
CPC ..... H04W 16/14; H04W 12/12; H04W 12/08; H04W 48/16; H04W 84/18; H04W 24/00;
(Continued)

(56) References Cited

U.S. PATENT DOCUMENTS 9,826,567 B2 * 11/2017 Peng ..................... H04W 36/00
2004/0008138 A1 * 1/2004 Hockley, Jr. .......... G01S 5/0072
342/357.48

(Continued)

FOREIGN PATENT DOCUMENTS

EP 2 408 234 A1 1/2012
JP 2013-118583 A 6/2013
(Continued)

OTHER PUBLICATIONS

Extended European search report with supplementary European search report and the European search opinion issued by the European Patent Office for corresponding European Patent Application No. 15879903.1, dated Dec. 14, 2017.
(Continued)

*Primary Examiner* — Nimesh Patel
(74) *Attorney, Agent, or Firm* — Myers Wolin, LLC

(57) ABSTRACT

A base station includes a storage device to store results of carrier sensing performed respectively on a data transmission side and on a data reception side with respect to a plurality of sub-bands in unlicensed frequencies being the frequencies of which a use is not licensed for data transmission, and a controller to extract sub-bands of the unlicensed frequencies being determined that are in an idle status or have high possibility to be in the idle status by both of the data transmission side and the data reception side in the carrier sensing results as candidates for sub-bands of the unlicensed frequencies to be used for transmitting data by the data transmission side.

8 Claims, 12 Drawing Sheets

(51) Int. Cl.
  *H04W 16/14* (2009.01)
  *H04W 4/70* (2018.01)
  *H04W 72/04* (2009.01)
  *H04W 72/14* (2009.01)
  *H04W 92/18* (2009.01)
  *H04B 17/336* (2015.01)
  *H04W 88/08* (2009.01)

(52) U.S. Cl.
  CPC ....... *H04W 72/0453* (2013.01); *H04W 72/14* (2013.01); *H04B 17/336* (2015.01); *H04W 88/08* (2013.01); *H04W 92/18* (2013.01)

(58) Field of Classification Search
  CPC ....... H04W 4/02; H04W 24/02; H04W 4/008; H04W 4/023; H04W 64/00; H04W 72/04; H04W 72/0453; H04W 72/12; H04W 88/08; H04W 72/082
  See application file for complete search history.

(56) References Cited

U.S. PATENT DOCUMENTS

| | | | | |
|---|---|---|---|---|
| 2011/0055070 A1* | 3/2011 | Stanforth | ............. | G06Q 10/063 705/37 |
| 2011/0228666 A1* | 9/2011 | Barbieri | ................ | H04W 76/14 370/216 |
| 2011/0258327 A1* | 10/2011 | Phan | ..................... | H04W 76/14 709/227 |
| 2012/0044815 A1* | 2/2012 | Geirhofer | ........... | H04W 72/082 370/248 |
| 2013/0143591 A1* | 6/2013 | Silny | ..................... | G01S 5/0072 455/456.1 |
| 2015/0133133 A1* | 5/2015 | Isobe | ................... | H04W 76/14 455/450 |
| 2016/0029429 A1 | 1/2016 | Peng et al. | | |
| 2017/0156075 A1* | 6/2017 | Harada | ................. | H04W 24/10 |

FOREIGN PATENT DOCUMENTS

| | | |
|---|---|---|
| JP | 2013-523018 A | 6/2013 |
| JP | 2013-223193 A | 10/2013 |
| WO | 2014/146556 A1 | 9/2014 |

OTHER PUBLICATIONS

International Search Report issued for corresponding International Patent Application No. PCT/JP2015/052230, dated Mar. 31, 2015.
Written opinion of the International Searching Authority issued for corresponding International Patent Application No. PCT/JP2015/052230, dated Mar. 31, 2015, with partial English translation.
Notice of Preliminary Rejection issued by the Korean Intellectual Property Office for corresponding Korean Patent Application No. 10-2017-7017974, dated Mar. 20, 2018, with English translation.
Notification of Reasons for Refusal issued by the Japan Patent Office for corresponding Japanese Patent Application No. 2016-571556, dated Apr. 3, 2018, with an English translation.

* cited by examiner

BASE STATION AND METHOD FOR DETERMINING UNLICENSED FREQUENCY CANDIDATE

CROSS-REFERENCE TO RELATED APPLICATION

This application is a continuation application of International Application PCT/JP2015/052230 filed on Jan. 27, 2015 and designated the U.S., and the entire contents of which are incorporated herein by reference.

FIELD

Disclosure relates to a base station and a method for determining an unlicensed frequency candidate.

BACKGROUND

One of wireless communications standards standardized by Third Generation Partnership Project (3GPP) is Long Term Evolution (LTE). In recent years, some of LTE base stations (eNB: evolved Node B) and LTE user equipments (UEs) support not only LTE communications but also communications based on wireless communication standards other than the LTE, such as Wireless Fidelity (WiFi) and wireless LAN (wireless Local Area Network).

Further, in the 3GPP, Release 12, a discussion about Device-to-Device (D2D) communications performed at LTE wireless network (E-UTRAN: Evolved Universal Terrestrial Radio Access Network) is underway. In the D2D communications, wireless communications are directly performed between terminals (each called User Equipment (UE)) conducting communications without through the base station.

For further information, refer to Japanese Patent Laid-Open Publication No. 2013-223193.

SUMMARY

The LTE D2D is designed to conduct the communications in which the terminal (D2D UE: hereinafter be abbreviated to "DUE" as the case may be) performing the D2D communications uses a frequency band (hereinafter referred to as "Licensed Band (L band)") authorized (licensed) for the LTE by an administrative body and this like.

However, some of the UEs support communications based on wireless communication standards other than the LTE as described above. Some of wireless communication standards other than the LTE include a standard using an unlicensed band that dedicated use at the standard is unauthorized. The wireless LAN mentioned above is one of examples of such standard. A band used for communications based on such standard is called "U band (Unlicensed Band)." The Release 12 does not yet establish specifications about the D2D communications using the L band and the U band, and the specifications thereof are scheduled to be examined by next Release 13.

When using the U band in the D2D communications, it may be considered that a transmission side terminal in the D2D communications implements carrier sensing for the U band, and frequencies (sub-bands) taking an idle status in the U band are used for the D2D communications.

However, such a case may occur that the sub-bands in the U band, which are determined to be in the idle status by the transmission side terminal, are in use for other communications in the periphery of a reception side terminal. In this case, when data is transmitted by using these sub-bands, there exists an undesirable possibility that a quality of reception declines because of being affected by interference from other communications. A problem is that such a situation may occur also when the base station transmits the data to the terminal by using the U band frequencies.

An aspect of embodiments is a base station including a storage device to store results of carrier sensing performed respectively on a data transmission side and on a data reception side with respect to a plurality of sub-bands in unlicensed frequencies as the frequencies of which a use is not licensed for data transmission, and a controller to extract at least one or more sub-bands of the unlicensed frequencies being determined that are in an idle status or have high possibility to be in an idle status by both of the data transmission side and the data reception side in the carrier sensing results as candidates for sub-bands of the unlicensed frequencies to be used for transmitting data by the data transmission side.

The target and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will hereinafter be described with reference to the drawings. Configurations of the embodiments are exemplifications, and the present invention is not limited to the configurations of the embodiments.

The embodiment will discuss a wireless communication system provided with a base station including a storage device to store results of carrier sensing being performed respectively on a data transmission side and a data reception side about a plurality of sub-bands in unlicensed frequencies being frequencies of which a use is not licensed for data transmission, and a controller to extract at least one or more sub-bands of the unlicensed frequencies determined that are in an idle status or have high possibility to be in the idle status by both on the data transmission side and on the data reception side with respect to carrier sensing results, as candidates for sub-bands of the unlicensed frequencies used for the data transmission side to transmit data.

A first embodiment will discuss a wireless communication system configured so that the data transmission side and the data reception side are respectively a transmission terminal and a reception terminal each performing a device-to-device communication (D2D communication). A second embodiment will discuss a wireless communication system, the configuration being such that the data transmission side and the data reception side are respectively a base station and a terminal.

First Embodiment

<Related Technologies>

A description starts with related technologies in connection with the first embodiment. When a multiplicity of DUE pairs performing the D2D communications using only the L band occurs, such a possibility arises that radio resources of the L band may lack. Alternatively when a data size of traffic transmitted and received between the DUEs in the D2D communications is large, a possibility is to implement traffic off-loading (i.e., to divert overflowed data to a line different from the LTE line). Herein, when able to support the D2D communications by using spectrums of the U band, such feasibilities may improve a system throughput.

When using spectrums of a U band, a DUE on a transmission side (which is also referred to as "DUE Tx" as the case may be) executes carrier sensing of the U band. The carrier sensing is executed for determining whether a radio resource is used for another communication before the DUE Tx starts transmitting data to the DUE on the reception side (which is also termed "DUE Rx" as the case may be). Detection of a carrier wave transmitted from another communication device (e.g., the base station or the UE) by the carrier sensing implies that this carrier wave (the radio resource) is in use for another communication. In this case, to avoid interference, the DUE Tx initiates data transmission after the use of this carrier wave is finished.

Figure 1:
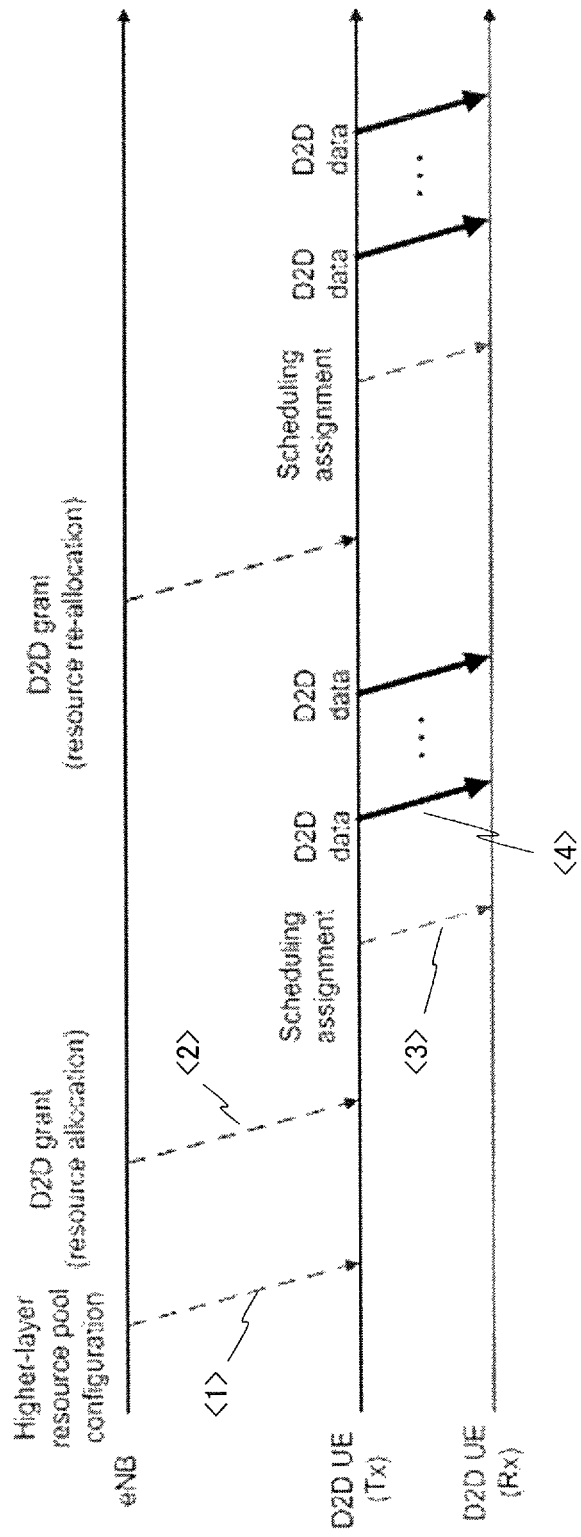
FIG. 1 is an explanatory diagram of a radio source allocation method (mode 1) in D2D communications.

Given next is a description of how the radio resources for the D2D communications are allocated. A mode 1 and a mode 2 are given as methods of allocating the radio resources related to the D2D standardized by 3GPP Release 12 so far. FIG. 1 is an explanatory diagram of the radio resource allocating method (mode 1) in the D2D communications. The mode 1 is that the base station (eNB) allocates the radio resources used for the D2D communications.

In the mode 1, the base station (eNB) supplies information (resource pool configuration) representing a configuration of a resource pool to the DUE Tx and the DUE Rx (<1> in FIG. 1). The resource pool indicates indices (list) of the radio resources usable for the D2D communications. The information representing a configuration of a resource pool may include resource information to transmit "Scheduling Assignment (SA)," which is discussed below, from the DUE Tx to the DUE Rx. A part of or all of the information representing a configuration of a resource pool may be preset to the DUE instead of supply using eNB.

Thereafter, the base station performs scheduling of the radio resources (time and frequencies (sub-band)) to be used by the DUE Tx. The radio resource used by the DUE Tx for the D2D communications (transmission of the data and control information) is allocated based on the scheduling. The base station notifies the DUE Tx of an allocation result of the radio resource (<2> in FIG. 1). The notification involves using a control signal called "D2D Grant".

The DUE Tx transmits a scheduling result received from the base station by a control signal called scheduling assignment (SA) to the DUE Rx (<3> in FIG. 1). The DUE Rx may know, with a reception of the SA, the radio resource used for the D2D communications. Thereafter, the DUE Tx transmits data (D2D Data) to the DUE Rx by using the allocated radio resource (<4> in FIG. 1).

Though not illustrated, in the mode 2, not the base station but the DUE Tx allocates the radio resources. Namely, the DUE Tx allocates the radio resource extracted from the resource pool and used for the D2D communication (scheduling), and transmits the SA to the DUE Rx. In this case, the information representing a configuration of a resource pool is preset in the DUE Tx, or the DUE Tx having a state which may communicate with the base station receives the information included in a signal corresponding to FIG. 1<1> from the base station to set the information to the DUE Tx.

As described above, the Release 12 does not yet determine specifications about the D2D communications using the L band and the U band. In other words, any scheduling method for the U band is not yet determined. Herein, it may be considered that the scheduling of the U band is conducted through an extension of the mode 1 described above.

Figure 2:
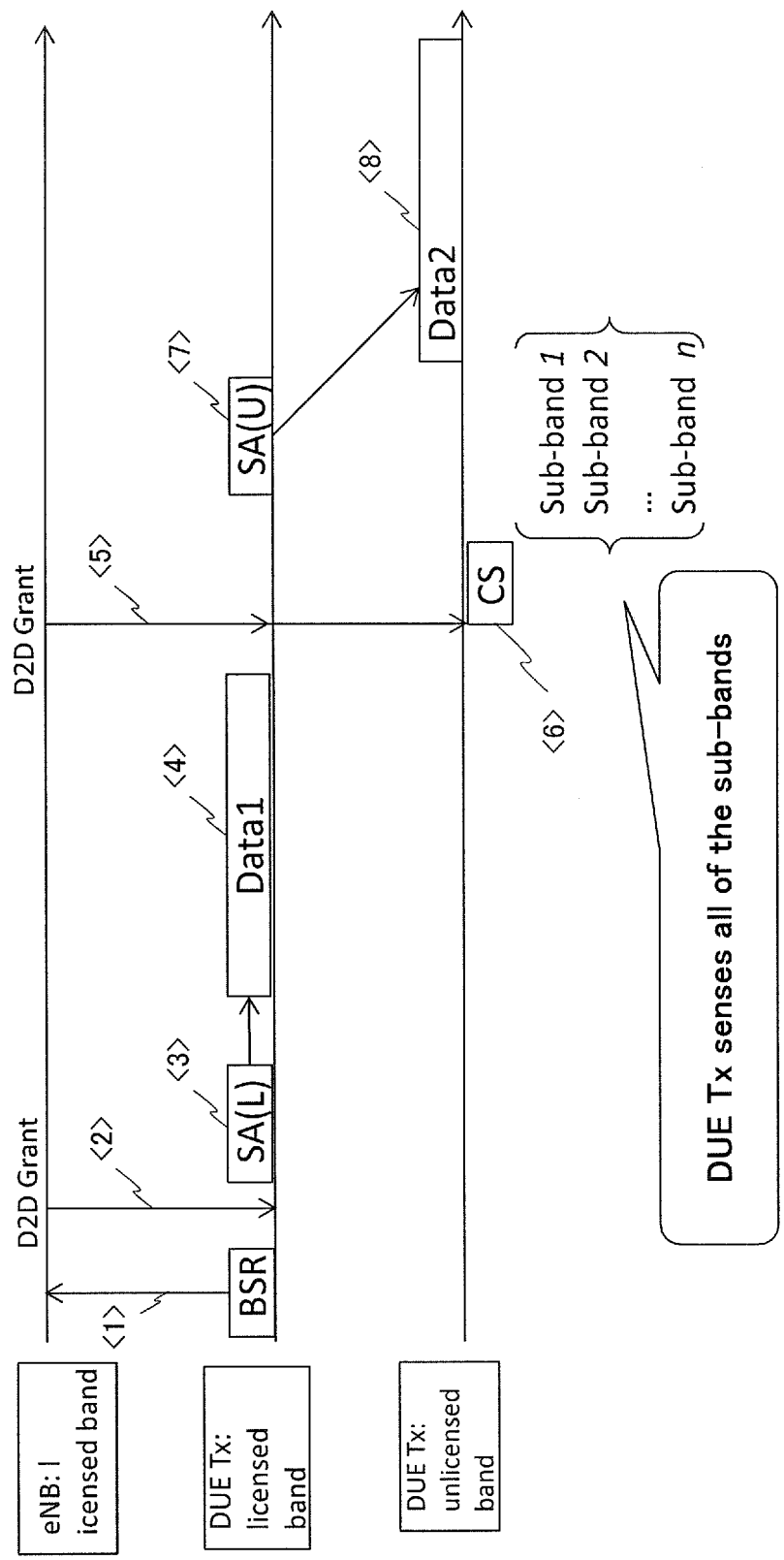
FIG. 2 illustrates one example of a method of scheduling a U band through an extension of the mode 1.

FIG. 2 depicts one example of a method of performing the scheduling of the U band. The mode 1 takes only the licensed spectrums (L band) into consideration but does not take account of the unlicensed spectrums (U band). Therefore, a procedure related to the allocation of the unlicensed spectrums (U band) is added to the procedure of the mode 1.

Though not illustrated, the following procedure is carried out upon a start of the mode 1. To be specific, the DUE Tx performs a random access procedure with respect to the base station (eNB) and establishes a wireless connection (establishes an RRC (Radio Resource Control) connection) with the eNB. The DUE Tx, when desiring to transmit the data to the DUE Rx, sends a signal of a scheduling request (SR) to the base station. The signal may be different from a signal used when the DUE Tx desires transmission of data to eNB in a traditional manner.

The base station sends, to the DUE Tx, a signal (UL grant for BSR) indicating that an uplink (UL) is allowed to be used for transmitting a Buffer Status Report (BSR). Thereupon, the DUE Tx sends the BSR to the base station (<1> in FIG. 2). The BSR indicates a size of data (i.e., the data size scheduled for the transmission to the DUE Rx) remaining in the buffer.

The base station receiving the BSR performs the scheduling of the radio resources related to the L band corresponding to a buffer size indicated by the BSR, and transmits the D2D Grant containing a scheduling result of the L band to the DUE Tx. The DUE Tx sends, to the DUE Rx, an SA (SA(L)) representing the scheduling result of the L band (allocation result of the radio resources) (<3> in FIG. 2). Thereafter, the DUE Tx transmits the data (Data 1) to the DUE Rx by using the allocated radio resource of the L band (<4> in FIG. 2).

What is given below may be considered with respect to the transmission using the U band. For example, the base station, when receiving the BSR, determines whether the U band is used. As a result of analyzing the BSR, when unable to ensure the radio resource for transmitting the data from only the L band, the U band is determined to be used. In this case, the base station sends the D2D Grant related to the U band after transmitting the D2D Grant related to the U band (<5> in FIG. 2). Though illustrated, the D2D Grant related to the L band and the D2D Grant related to the U band may be integrated.

The D2D Grant related to the U band may include radio resource information of the L band for the DUE Tx transmitting "SA (U)" (later discussion) to the DUE Rx. However, the D2D Grant related to the U band does not, however, contain the scheduling result of the U band (designation of the allocation result of the U band) by the base station. This is because the base station does not perform the scheduling of the U band.

Hence, the DUE Tx implements the carrier sensing (CS) for the U band (<6> in FIG. 2). The carrier sensing is implemented targeting on all of the sub-bands (1–n (n is a natural number) of the unlicensed spectrums configuring the U band. The DUE Tx determines whether the sub-band is being used (busy) or unused (idle) on a per sub-band basis.

The DUE Tx determines, as the result of the carrier sensing, the sub-band used for the D2D communications from within the sub-bands in the idle status, and transmits the SA (SA(U)) indicating the determined sub-band to the DUE Rx by using the radio resource of the L band (<7> in FIG. 2). Thereafter, the DUE Tx transmits the data (Data 2) to the DUE Rx in accordance with the SA(U) (<8> in FIG. 2).

However, the method illustrated in FIG. 2 has problems described below. A first problem is that the execution of the carrier sensing on all of the sub-bands of the unlicensed spectrums by the DUE Tx brings about an increase in load on the DUE Tx and, by extension, a rise in power consumption.

A second problem is that the sub-band determined to be usable (idle) by the DUE Tx is not improbable to be used in the periphery of the DUE Rx as the case may be. For example, a probable case is that the DUE Tx is distanced relatively far from the DUE Rx, and the use of the sub-band is not observed, while this sub-band is used by another device in the periphery of the DUE Rx. This case may lead to a possibility that a quality of reception of the data in the DUE Rx declines due to the interference.

A third problem is that a size of the SA (U) to be sent to the DUE Rx increases. To be specific, a format (contents) of the SA (U) is required to indicate sub-bands really used for D2D communications from among all of unlicensed bands each of which has a possibility to be used at the DUE Tx. Therefore, the size of the SA (U) depends on the number of the sub-bands. A fourth problem is that the method illustrated in FIG. 2 includes transmitting twice the SA related to the L band and the SA related to the U band, and hence the procedure becomes complicated.

The embodiment, which will hereinafter be described, will discuss the base station (eNB) and the user equipment (DUE) that may solve the first through fourth problems illustrated in FIG. 2.

<Network Architecture in First Embodiment>

Figure 3:
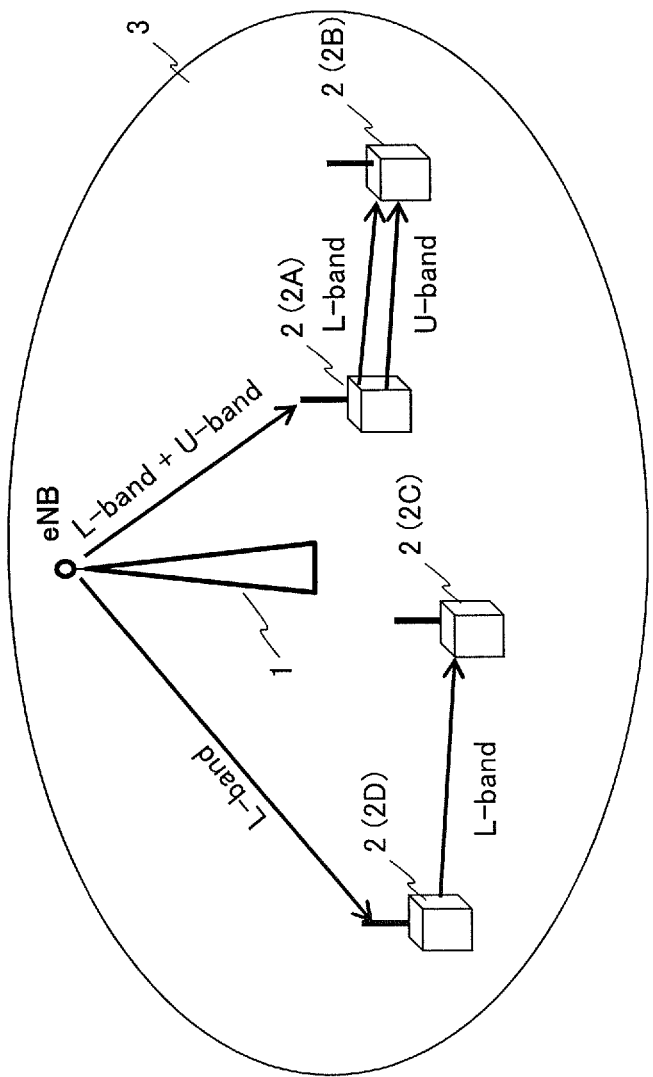
FIG. 3 is a diagram illustrating an example of a configuration of a wireless communication system according to a first embodiment.

FIG. 3 is a diagram illustrating an example of architecture of the wireless communication system according to the first embodiment. FIG. 3 depicts abase station (eNB) 1 and a plurality of user equipment (UEs) 2 as one example of the wireless communication system.

The UE 2 may conduct the D2D communications by use of the mode 1 described above. FIG. 3 illustrates how UE 2C and UE 2D perform the D2D communications upon receiving the scheduling result of the L band from the base station 1 within a coverage area (cell) 3 of the base station 1.

Further, the wireless communication system depicted in FIG. 3 enables the D2D communications to be performed by using the L band and the U band. FIG. 3 depicts how UE 2A operating as the DUE Tx performs the D2D communications with the UE 2B operating as the DUE Rx upon receiving information on the L band and the U band from the base station 1 in the coverage area 3. The UE 2A is one example of a "transmission terminal", while the UE 2B is one example of a "reception terminal".

<Procedure of D2D Communication>

Figure 4:
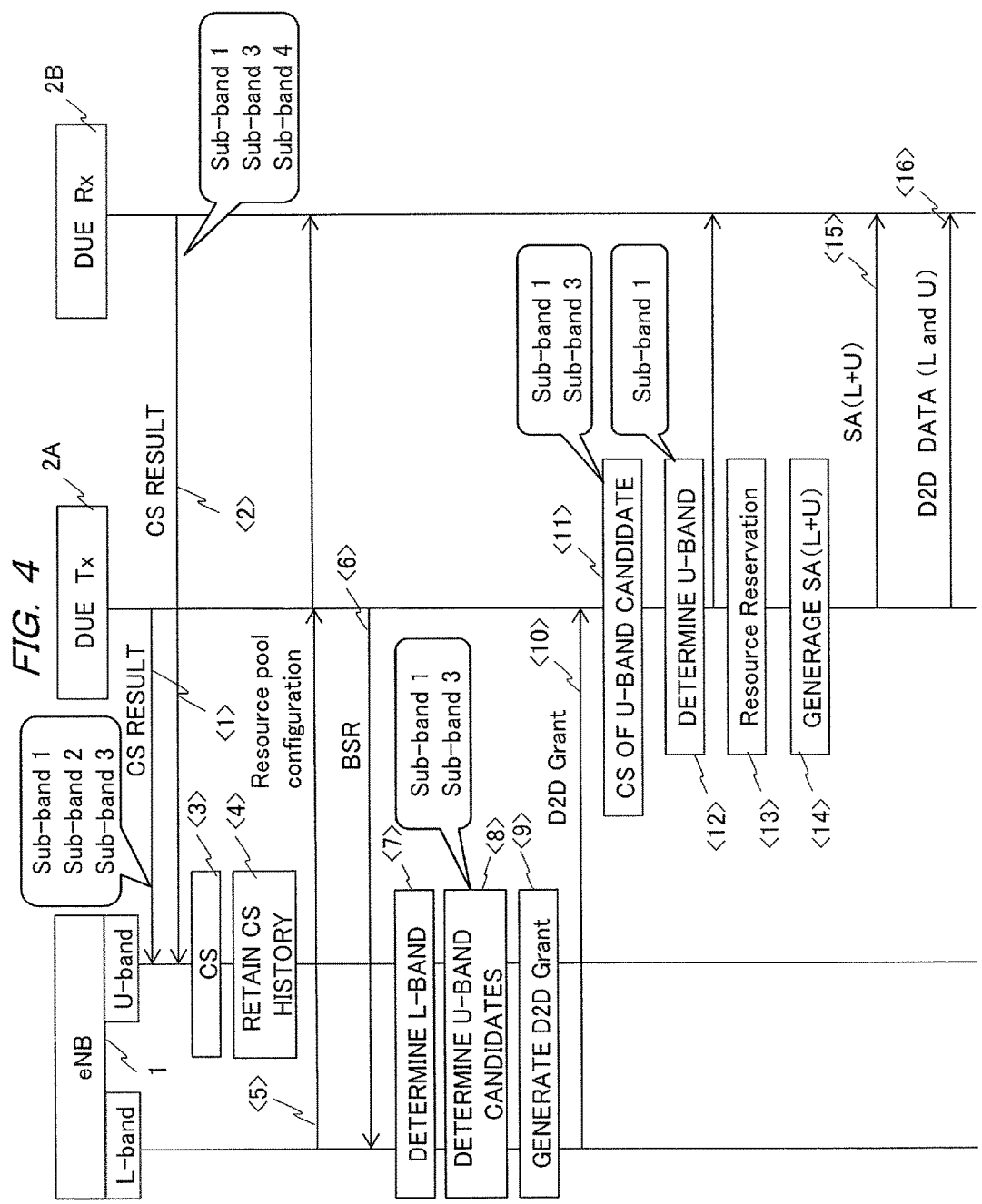
FIG. 4 is a sequence diagram illustrating one example of a procedure of D2D communications according to the first embodiment.

FIG. 4 is a sequence diagram illustrating one example of a procedure of the D2D communications according to the first embodiment. In the wireless communication system according to the first embodiment, the DUE Tx (UE 2A) and the DUE Rx (UE 2B) being wirelessly connected respectively to the base station 1 and performing the D2D communications, transmit a result (CS Result) of the carrier sensing related to the U band to the base station 1 at proper timing (<1>, <2> in FIG. 4). The carrier sensing may be periodically implemented, and the implementation thereof may also be caused by some sort of trigger. Moreover, as for a range of the carrier sensing, this carrier sensing may be implemented for all of the sub-bands in the U band and may also be implement for a part of the U band. The range of the carrier sensing for the U band may be properly set. The base station 1 may calculate probability that each of the sub-bands has an idle state based on a history of carrier sensing.

The base station 1 is notified of the information indicating the sub-bands taking the idle status in the U band as the result of the carrier sensing. In the example in FIG. 4, the DUE Tx notifies the base station 1 that the sub-bands 1, 2 and 3 are in the idle status, and the DUE Rx notifies the base station 1 that the sub-bands 1, 3 and 4 are in the idle status.

The base station 1 also performs the carrier sensing with respect to the U band at the proper timing (<3> in FIG. 4). The results of the carrier sensing by the DUE Tx, the DUE Rx and the base station 1 are saved (stored) in the base station 1 as a history of the carrier sensing (which is also referred to as "historic carrier sensing results") (<4> in FIG. 4). The range of the carrier sensing in the base station 1 may be adequately set. Note that the carrier sensing by the base station 1 is not an indispensable but optional configuration.

The base station 1 broadcasts information (Resource pool configuration) representing a resource pool configuration towards the DUEs by using a System Information Block (SIB). The resource pool configuration represents the radio resources (the time and the frequencies) usable to the UEs for the D2D communications. The resource pool configuration may contain only the information on the L band and may further contain information on the U band.

The resource pool configuration is received by the DUE Tx (UE 2A) and the DUE Rx (UE 2B) through broadcasting (<5> in FIG. 4). The DUE Tx and the DUE Rx are thereby enabled to know the radio resources of the L band, the resources being usable for the D2D communications.

The DUE Tx (UE 2A) desiring to transmit the data to the DUE Rx (UE 2B) sends the BSR to the base station 1 (<6> in FIG. 4). The base station 1 determines, based on the BSR, the radio resources (the time and the frequencies) of the L band, the resources being used for the D2D communications (<7> in FIG. 4).

Next, when the base station determines that the base station 1 needs to perform D2D communication using the U band based on the BSR, the base station 1 determines candidates for the sub-bands of the U band (which are termed "U band candidates"), on which the DUE Tx performs the carrier sensing, by use of the historic carrier sensing results (<8> in FIG. 4). The U band candidates are determined, e.g., as below. For instance, the sub-bands with an idle rate being 100% or having a high idle rate are extracted by comparing the historic carrier sensing results of the DUE Tx, the DUE Rx and the base station 1.

For example, in the example illustrated in FIG. 4, the historic carrier sensing results of the DUE Tx represent that the sub-bands 1, 2 and 3 have high idle rate. In contrast with this, the historic carrier sensing results of the DUE Rx represent that the sub-bands 1m 3 and 4 high idle rate. In this case, the idle rate of each of the sub-bands 1 and 3 is high, while the idle rate of each of the sub-bands 2 and 4 is low. Accordingly, the sub-bands 1 and 3 are selected (determined) as the U band candidates. Thus, the sub-bands determined to be in the idle status or to have high idle rate by both of the DUE Tx and the DUE Rx are extracted as the U band candidates.

Note that the historic carrier sensing results (the carrier sensing results) of the base station 1 are saved, in which case the calculation of the idle rate takes account of the historic carrier sensing results of the base station 1. In the example depicted in FIG. 4, the historic carrier sensing results of the base station 1 represent that the sub-bands 1 and 3 are in the idle status, and an assumption is that the sub-bands 1 and 3 are determined as the final U band candidates.

Next, the base station 1 generates a control signal (D2D Grant) that permits the D2D communications (<9> in FIG. 4). The D2D Grant contains an allocation result of the radio resources of the L band and the U band candidates. The base station 1 transmits the D2D Grant to the DUE Tx (<10> in FIG. 4). The D2D Grant is one example of a "signal configured to integrate an allocation result of radio resources using licensed frequencies and candidates of the unlicensed frequencies".

The DUE Tx receiving the D2D Grant executes the carrier sensing about the U band candidates in the D2D Grant (<11> in FIG. 4). In the example of FIG. 4, the carrier sensing about the sub-bands 1 and 3 is executed.

The DUE Tx determines, based on the result of the carrier sensing, the sub-bands in the U band that are used for the D2D communications (<S12> in FIG. 4). For example, as the result of the carrier sensing, when the sub-band 1 is idle, while the sub-band 3 is busy, the sub-band 1 is determined to be used. Note that when the sub-band 1 and the sub-band 3, when both are idle, are determined to be used.

The DUE Tx reserves the resources (Resource Reservation) for the sub-bands determined to be used (<13> in FIG. 4). The resource reservation is made by transmitting a resource reservation signal indicating that other communication devices (other UEs etc.) are inhibited from using the sub-bands for a predetermined period (for which to conduct the D2D transmission).

Next, the DUE Tx generates SA (notated by "SA (L+U)") into which the SA related to the L band and the SA related to the U band are integrated (integrated) (<14> in FIG. 4). The SA (L+U) contains information indicating the allocation result of the radio resources of the L band, the resources being used for the D2D communications, and information indicating the radio resources (the time and the frequencies) of the sub-bands of the U band, the sub-bands being determined to be used.

The DUE Tx transmits the SA (L+U) to the DUE Rx by using the radio resources of the L band (<15> in FIG. 4). Thereafter, the DUE Tx transmits the data directly to the DUE Rx by use of the radio resources of the L band and the radio resources of the U band (<16> in FIG. 4). At this time, the data transmission using the L band and the data transmission using the U band may be executed in parallel and may also be executed in serial.

Note that when all of the U band candidates are busy in the process in <12> described above, the D2D transmission using only the L band is executed. In this case, the SA (L+U) represents only the information on the L band. Whereas when the L band being usable with the D2D Grant is not indicated, the D2D transmission using only the U band is executed.

<Effects of First Embodiment>

The first embodiment may acquire at least the following effects. To be specific, both of the L and and the U band are used for the D2D communications, thereby enabling a throughput of the D2D communications to be improved.

Further, in the first embodiment, the unlicensed sub-bands determined to be in the idle status by at least the DUE Tx and the DUE Rx, are extracted as the U band candidates. This enables a reduction of a possibility that the unlicensed sub-bands, of which the use is determined by the DUE Tx, are in use in the periphery of the DUE Rx. In other words, it is feasible to avoid the interference with the data transmission using the unlicensed sub-bands (the unlicensed frequencies). A quality of the D2D communications using the U band may be thereby improved.

Moreover, in the first embodiment, the DUE Tx performs the carrier sensing about the sub-bands being notified via the D2D Grant to determine the U band used for the D2D communications. As compared with when the DUE Tx performs the carrier sensing on all of the sub-bands in the U band, it is possible to reduce the load on the carrier sensing by the DUE Tx and also the power consumption.

Moreover, in the first embodiment, the base station 1 transmits the signal (D2D Grant) containing the scheduling result of the L band and the U band candidates to the DUE Tx and the D2D Rx. This enables simplification of the procedure of the D2D communications using the L band and the U band.

Furthermore, in the first embodiment, the DUE Tx transmits the SA (L+U) indicating the scheduling results of the L band and the U band to the DUE Rx. This also enables the simplification of the procedure of the D2D communications using the L band and the U band.

A format of the SA (L+U) may be used in common also to when conducting the D2D communications using only the L band and the U band. A method of decoding the SA (L+U) in the DUE Rx may be thereby unified, and hence complexity in processing of the DUE Rx is lessened.

Further, in the format of the SA (L+U), the information on the U band becomes the scheduling result related to the sub-bands with the use being determined but does not contain the indices of all of the sub-bands of the U band. A size of the SA (L+U) may be thereby decreased.

Still further, in the first embodiment, as the result of the carrier sensing about the U band candidates, the resources are reserved for the sub-bands with the use being determined. It is thereby possible to avoid the sub-bands from being used by other communication devices. As a consequence, the interference with the D2D reception may be avoided.

<Example of Configuration of Base Station>

Figure 5:
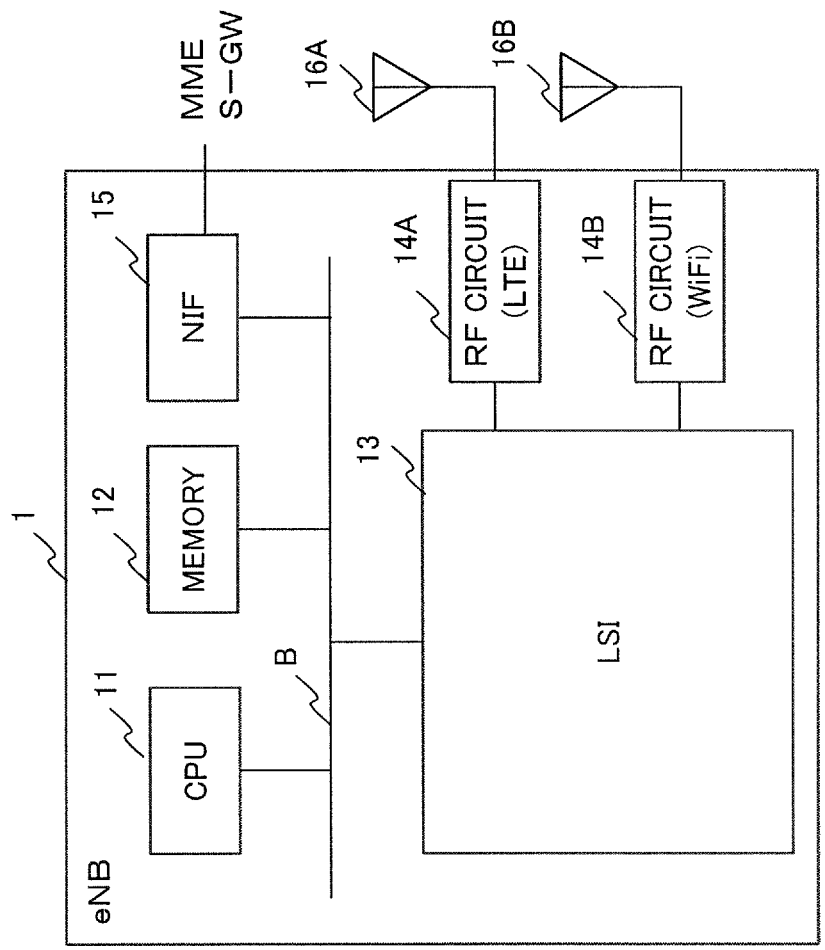
FIG. 5 is a diagram illustrating an example of a hardware configuration of a base station (eNB)

Next, an example of a configuration of the base station 1 stated above will be described. FIG. 5 is a diagram illustrating an example of a hardware configuration of the base station (eNB) 1. In FIG. 5, the base station 1 includes a central processing unit (CPU) 11, a memory 12, a large scale integrated circuit (LSI) 13, an RF circuit 14A for LTE, an RF circuit 14B for WiFi and a network interface (NIF) 15, which are interconnected via a bus B. An antenna 16A is connected to the RF circuit 14A, and an antenna 16B is connected to the RF circuit 14B.

In the example in FIG. 15, the frequency band licensed to be used for the LTE is the L band, while the frequency band used for the WiFi is the U band. The frequency band used as the U band is not, however, limited to the WiFi frequency band.

The memory 12 is one example of a "storage device" and a "non-transitory computer readable recording medium". The memory 12 includes a main storage device and an auxiliary storage device. The main storage device is used as a work area of the CPU 11. The main storage device is configured by e.g., a Random Access Memory (RAM) or combining the RAM with a Read Only Memory (ROM).

The auxiliary storage device stores a program executed by the CPU 11 and the data used when executing the program. At least one of, e.g., a hard disk drive (HDD), a solid state drive (SSD) a flash memory and an erasable programmable read only memory (EPROM) may be selected as the auxiliary storage device. The auxiliary storage device may include a disc recording medium such as a CD (Compact Disc), a DVD (Digital Versatile Disc) and a Blu-ray disc.

The NIF 15 is an interface circuit or an interface device operating as a transmission path interface unit. The NIF 15 receives a transmission path of a network such as Ethernet (LAN) and is connected to a core network device such as a mobility management entity (MME) and a serving gateway (S-GW) and to another communication device such as a neighboring base station. The NIF 15 executes a process of transmitting and receiving an IP packet to and from the connected communication device. For example, a LAN card or a network interface card (NIC) may be applied as the NIF 15.

The LSI 13 may be configured by at least one of, e.g., a general-purpose LSI, an application specific integrated circuit (ASIC) and a programmable logic device (PLD) such as a field programmable gate array (FPGA) or by a combination of these two or more components. The LSI 13 may include a digital signal processor (DSP) according to the case.

The LSI 13 is an integrated circuit to operate as a baseband processing unit. A baseband process includes a process of converting the data into a baseband signal through data coding and a data modulating process, and a process of obtaining the data from the baseband signal through a demodulating process and decoding with respect to the baseband signal.

The LSI 13 carries out a converting process between the IP packet and the baseband signal with respect to a user plane (U plane) signal. Further, the LSI 13 conducts a process of handing over, to the CPU 11, the baseband signal received from the UE and the control signal obtained from the IP packet received from the core network and another base station (the neighboring base station). On the other hand, the LSI 13 performs a process of converting the control signal obtained from the CPU 11 into the IP packet directed to the core network and another base station and into the baseband signal directed to the UE.

The RF circuit 14A and the RF circuit 14B have the same configuration, and a description will be made by taking the RF circuit 14A for example. The RF circuit 14A includes, e.g., a modulation/demodulation circuit, an up-converter, a power amplifier (PA), a duplexer, a low-noise amplifier (LNA) and a down-converter. The duplexer is connected to the antenna 16A as a transmission/reception antenna.

The modulation/demodulation circuit modulates the baseband signal coming from the LSI 13 into an analog signal, converts the analog signal coming from the down-converter into the baseband signal, and sends these signals to the LSI 13. The up-converter up-converts the analog signal modulated by the modulation/demodulation circuit into a signal of a predetermined radio frequency (RF). The PA amplifies the up-converted signal. The amplified signal is radiated as a radio wave from the antenna 16A via the duplexer. The radio wave is received by the subordinate UE 2.

The antenna 16 receives the radio signal from the subordinate UE 2. The duplexer connects the radio signal to the LNA. The LNA performs low-noise amplification about the radio signal. The down-converter down-converts the signal undergoing the low-noise amplification into the analog signal. The modulation/demodulation circuit converts the analog signal into the baseband signal through the demodulation process of the analog signal, and transmits the converted baseband signal to the LSI 13.

The CPU 11 loads the program stored in the auxiliary storage device of the memory 12 onto the main storage device, and executes the loaded program. Along with this program, the CPU 11 executes processes related to the operations of the base station 1 as illustrated in the sequence diagram of FIG. 4. The CPU 11 is one example of a "control unit", a "controller" and a "processor".

To be specific, the CPU 11 executes a process of generating, upon receiving the carrier sensing (CS) results from the DUE Tx and the DUE Rx, information of the historic carrier sensing results and storing the generated information in the memory 12. Further, the CPU 11 generates information of the resource pool configuration, and controls broadcasting the resource pool configuration. Moreover, the CPU 11 executes a process of determining the L band based on the BSR (<7> in FIG. 4), a process of determining the U band candidates (<8> in FIG. 4) and a process of generating and transmitting the D2D Grant (<9>, <10> in FIG. 4).

Figure 6:
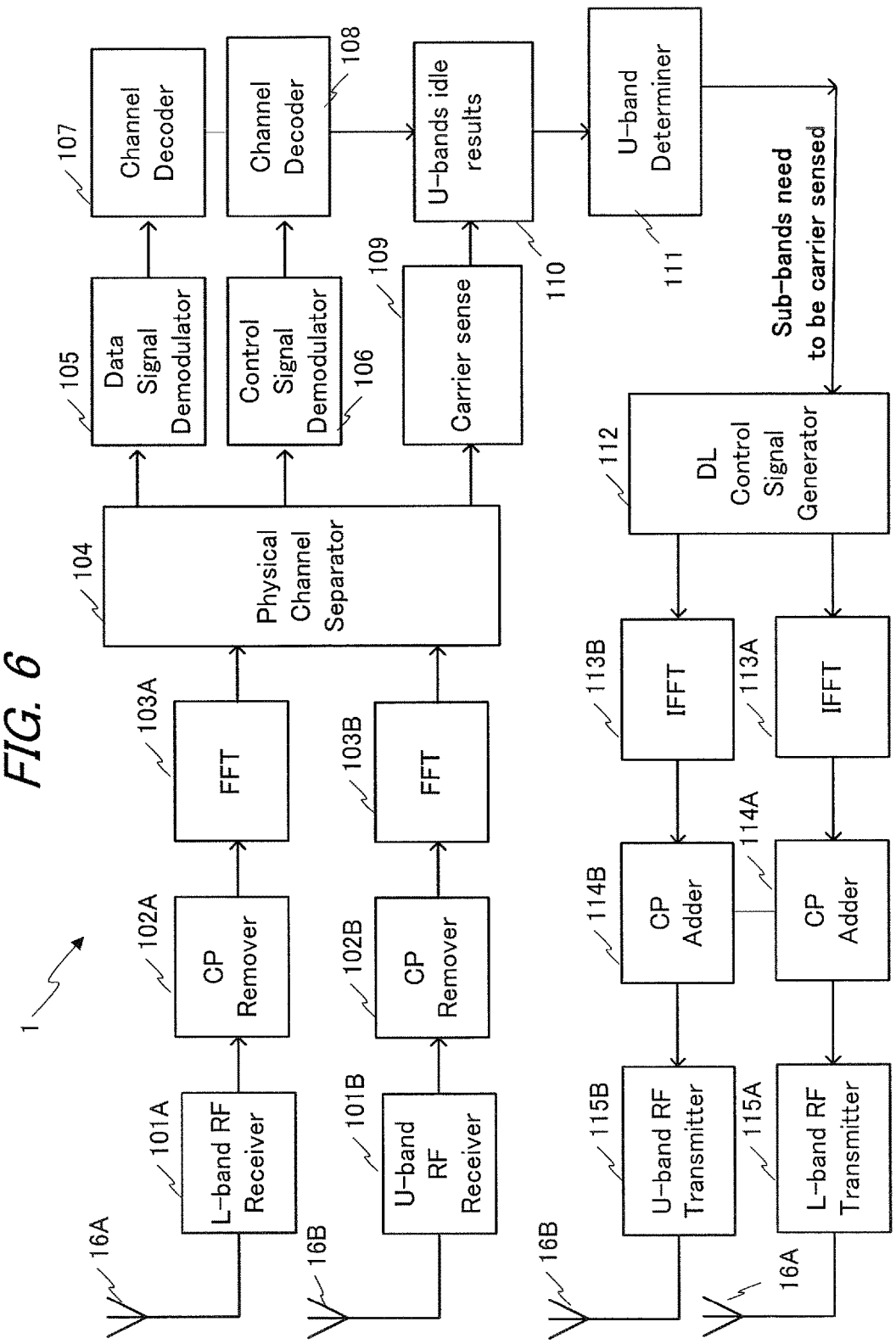
FIG. 6 is a diagram schematically illustrating functions of the base station depicted in FIG. 5.

FIG. 6 is a diagram schematically illustrating functions of the base station 1 depicted in FIG. 5. In FIG. 6, the radio signal of the L band, which is received by the antenna 16A and transmitted from the UE, is converted into the baseband signal by an L band receiver (L-band RF receiver) 101A and inputted to a CP removing unit (CP Remover) 102A.

The CP removing unit 102A removes a CP (Cyclic Prefix) from the baseband signal. An output signal of the CP removing unit 102A is Fourier-transformed by an FFT (Fast Fourier Transform) 103A and is separated into a plurality of physical channels by a physical channel separating unit (Physical Channel Separator) 104. A data signal on the physical channel is demodulated by a data signal demodulating unit (Data Signal Demodulator) 105 and decoded by a channel decoder 107. The data is thereby obtained from the baseband signal. On the other hand, the control signal on the physical channel is demodulated by a control signal demodulating unit (Control Signal Demodulator) 106 and decoded by a channel decoder 108. The control signal is thereby obtained from the baseband signal.

The carrier sensing results of the DUE Tx and the DUE Rx are contained, e.g., in the data obtained by the channel decoder 107. As a matter of course, the carrier sensing results may also be contained in the control signal obtained by the channel decoder 108. The carrier sensing results of the DUE Tx and the DUE Rx are handed over to a history processing unit (U-bands idle results) 110.

On the other hand, the U band radio signal received by the antenna 16B is converted into the baseband signal by a U band receiver 101B, and the CP of the baseband signal is removed by a CP removing unit 102B. An output signal of the CP removing unit 102B is Fourier-transformed by an FFT 103B and is inputted to the physical channel separating unit (Physical Channel Separator) 104.

A part of the output signals of the physical channel separating unit 104 are supplied to and undergo the carrier sensing by a carrier sensing unit 109. In other words, it is determined whether the received unlicensed sub-bands are idle or busy. The carrier sensing unit 109 executes the U band carrier sensing, and the result thereof is supplied to the history processing unit 110.

The history processing unit 110 generates a carrier sensing history upon receiving the carrier sensing results of the DUE Tx, the DUE Rx and the base station 1 itself. The generated carrier sensing history is stored in the memory 12.

A U band determining unit (U-band Determiner) 111 executes a process of determining the U band candidates when the BSR is obtained by the channel decoder 108 and when an unillustrated scheduler executes scheduling the L band. The U band determining unit 111 receives the carrier sensing results stored in the memory 12 from the history processing unit 110, and determines the U band candidates based on the determination method described above by use of the carrier sensing history.

A downlink (DL) control signal generating unit (DL Control Signal Generator (PDCCH Generator)) 112 generates the D2D Grant containing the L band scheduling result and the U band candidates, and maps the D2D Grant to a control channel (PDCCH: Physical Downlink Control Channel).

The PDCCH (D2D Grant) is subjected to inverse Fourier transform by an IFFT (Inverse Fast Fourier Transform) 113A, attached with the CP by a CP adding unit (CP adder) 114A, converted into the radio signal by an L band transmitter (L-band RF transmitter) 115A, and transmitted from the antenna 16A.

Note that the baseband signal, to which the U band control signal or the data is mapped, is subjected to inverse Fourier transform by an IFFT 113B, attached with the CP by a CP adding unit 114B, converted into the radio signal by a U band transmitter (U-band RF transmitter) 115B, and transmitted from the antenna 16B.

Note that the RF circuit 14A illustrated in FIG. 15 operates as the receiver 101A and the transmitter 115A. The RF circuit 14B operates as the receiver 101B and the transmitter 115B. The LSI 13 operates as the CP removing unit 102A, the CP removing unit 102B, the FFT 103A, the FFT 103B, the physical channel separating unit 104, the demodulating unit 105, the demodulating unit 106, the channel decoder 107 and the channel decoder 108. The LSI 13 further operates as the generating unit 112, the IFFT 113A, the IFFT 113B, the CP adding unit 114A and the CP adding unit 111B. However, a part or the whole of the blocks in the FIG. 6, which are executed by the LSI 13, may be also configured to be executed by the CPU 11.

The CPU 11 operates as the carrier sensing unit 109, the history processing unit 110 and the U band determining unit 111. However, the LSI 13 may be also configured to operate as at least one of the carrier sensing unit 109, the history processing unit 110 and the U band determining unit 111.

<Configuration of UE>

Figure 7:
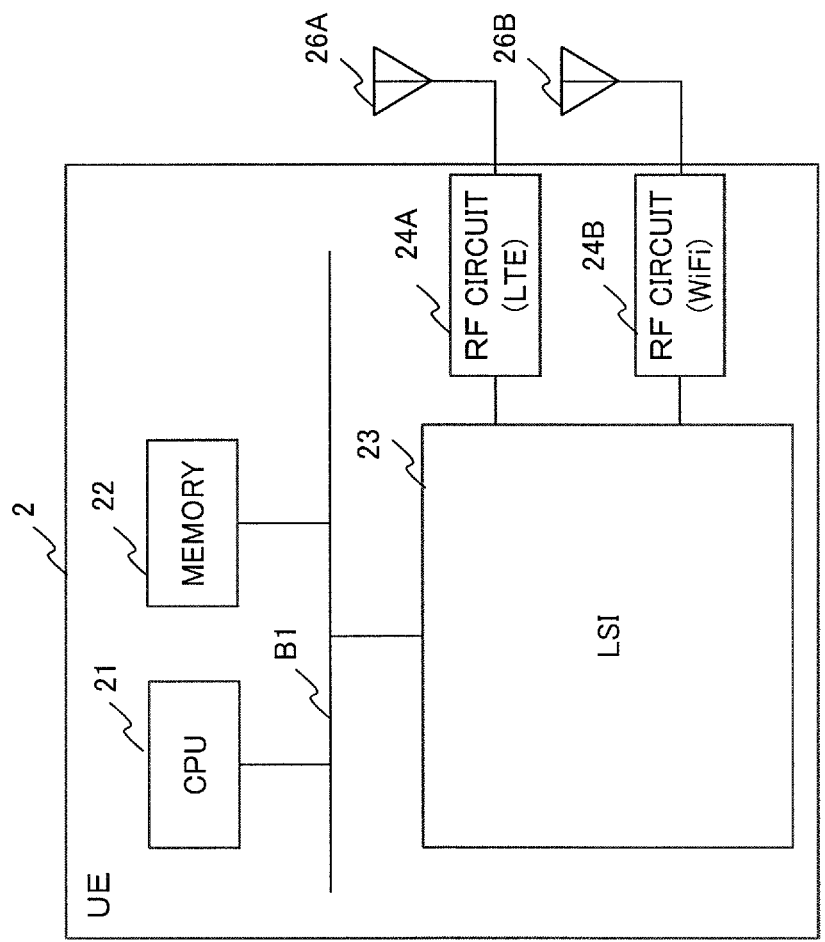
FIG. 7 is a diagram illustrating an example of a hardware configuration of a user equipment (UE)

Next, an example of a configuration of the UE 2 stated above will be described. FIG. 7 is a diagram illustrating an example of a hardware configuration of the user equipment (UE) 2. In FIG. 7, the UE 2 includes a CPU 21, a memory 22, an LSI 23, an RF circuit 24A for LTE and an RF circuit 24B for WiFi, which are interconnected via a bus B1. An antenna 26A is connected to the RF circuit 24A, and an antenna 26B is connected to the RF circuit 24B.

The memory 22 is one example of a "storage device" and a "non-transitory computer readable recording medium". The memory 22 includes a main storage device and an auxiliary storage device, and as the same configuration as that of the memory 12. Further, the memory 22 is used as a buffer to store the data transmitted and received through the D2D communications.

The LSI 23 may be configured by at least one of, e.g., the general-purpose LSI, the application specific integrated circuit (ASIC) and the programmable logic device (PLD) such as the field programmable gate array (FPGA) or by a combination of these two or more components. The LSI 23 may include the digital signal processor (DSP) according to the case.

The LSI 23 is the integrated circuit to operate as the baseband processing unit. The baseband process includes a process of converting the data into a baseband signal through data coding and a data modulating process, and a process of obtaining the data from the baseband signal through a demodulating process and decoding with respect to the baseband signal.

The RF circuit 24A and the RF circuit 24B have the same configuration, which is the same as the configuration of the RF circuit 14A.

The CPU 21 loads the program stored in the auxiliary storage device of the memory 22 onto the main storage device, and executes the loaded program. Along with this program, the CPU 21 executes processes related to the operations of the DUE Tx and the DUE Rx as illustrated in the sequence diagram of FIG. 4. The CPU 21 is one example of a "processor", a "control unit" and a "controller".

Namely, the CPU21 controls the carrier sensing for the U band and the transmission of the carrier sensing result. Further, the CPU 21 executes a process related to generation and transmission of the BSR. Moreover, the CPU 21 executes carrier sensing control of the U band candidates (<11> in FIG. 4), a U band determination process (<12> in FIG. 4), a resource reservation process (<13> in FIG. 4) and an SA(L+U) generation process (<14> in FIG. 4).

Note that the UE 2 includes, in addition to the components described above, an input device (keys, buttons, touch panel, etc.), and output device (display etc.) a microphone and a speaker as the case may be, however, their illustrations and explanations are omitted.

Figure 8:
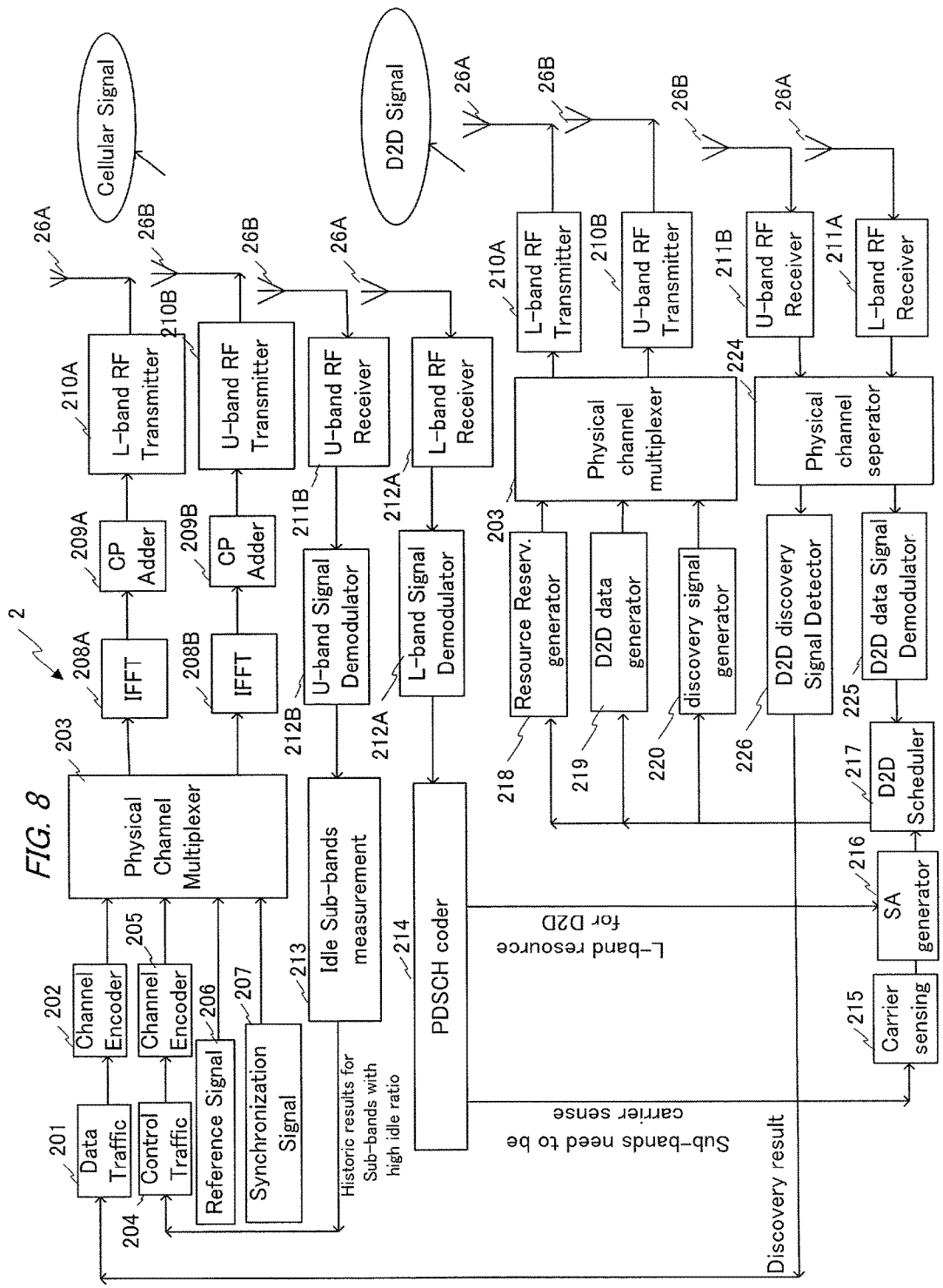
FIG. 8 is a diagram schematically illustrating functions of the UE depicted in FIG. 7.

FIG. 8 is a diagram schematically illustrating functions of the UE 2 depicted in FIG. 7. In FIG. 8, data (Data Traffic) 201 to be transmitted to the base station 1 is encoded by a channel encoder 202 and inputted to a physical channel multiplexing unit (Physical Channel Multiplexer) 203. On the other hand, a control signal (Control Traffic) 204 to be transmitted to the base station 1 is encoded by a channel encoder 205 and inputted to the physical channel multiplexing unit 203. Furthermore, a reference signal (Reference Signal) 206 and a synchronization signal (Synchronization Signal) 207 are generated and inputted to the physical channel multiplexing unit 203.

When conducting the L band transmission, the physical channel multiplexing unit 203 transmits, to the IFFT 208A, a signal obtained by mapping (multiplexing) the encoded data, the encoded control signal, the reference signal and the synchronization signal onto the physical channel having a format for the L band transmission. The IFFT 208A inverse- Fourier-transforms the signal, the CP adding unit 209A attaches the CP to the signal, the L band transmitter 210A converts an output signal from the CP adding unit 209A into the radio signal, and the radio signal is transmitted from the antenna 26A. Thus, the radio signal is transmitted to the base station 1.

When conducting the U band transmission, the physical channel multiplexing unit 203 transmits, to the IFFT 208A, a signal obtained by mapping (multiplexing) the encoded data, the encoded control signal, the reference signal and the synchronization signal onto the physical channel having a format for the U band transmission. The signal is converted into the U band transmitter 210B via the IFFT 208B and the CP adding unit 209B, and the radio signal is transmitted from the antenna 26B. Thus, the radio signal is transmitted to the base station 1.

The U band radio signal received by the antenna 26B is converted into the baseband signal by the U band receiver 211B, and is demodulated by a U band signal demodulating unit (U-band Signal Demodulator) 212B after undergoing an unillustrated CP removing process and an unillustrated FFT process. An idle sub-band measuring unit (Idle Sub-bands measurement) 213 conducts a measurement (carrier sensing) for the sub-band of the U band with respect to the demodulated signal. The measuring unit 213 determines whether the sub-band is in the idle status, and generates the carrier sensing result. The carrier sensing result is treated as a control signal 204 and transmitted from the antenna 26A to the base station 1 via the channel encoder 205, the physical channel multiplexing unit 203, the IFFT 208A, the CP adding unit 209A and the transmitter 210A. Note that the BSR is also treated as the control signal 204.

The L band radio signal received by the antenna 26A is converted into the baseband signal by the L band receiver 211A and is, after undergoing the unillustrated CP removing and FFT processes, demodulated by an L band demodulating unit (L-band Signal Demodulator) 212A. the demodulated signal is decoded by the decoder 214 the PDSCH (Physical Downlink Shared CHannel). At this time, items of information of the resource pool configuration (unillustrated), the scheduling result (L-band resource for D2D) of the L band in the D2D Grant and the U band candidates (Sub-bands need to be carrier sense), are obtained as a control channel decoding result.

The resource pool configuration is used for generating and transmitting the BSR. The information of the U band candidates is sent to the carrier sensing unit (Carrier sensing) 215, and the carrier sensing unit 215 implements the carrier sensing for the U band candidates and sends a result thereof to the SA generating unit (SA generator) 216.

The SA generating unit 216 determines the U band from the carrier sensing result of the U band candidates, then generates the SA (L+U) by using the carrier sensing result and the L band scheduling result, and hands over the SA (L+U) to the D2D scheduler 217.

The D2D scheduler 217 performs D2D transmission scheduling according to contents of the SA (L+U). At this time, the resource reservation about the U band used for the D2D transmission is generated and transmitted by a resource reservation generating unit 218. Further, a D2D data generating unit 219 generates the D2D data (containing the data and the control signal) to be transmitted via the radio resources based on the SA (L+U). The SA (L+U) is treated as the D2D data. Moreover, a discovery signal is generated corresponding to the D2D scheduling result. The discovery signal is used for mutually recognizing the D2D communication enabled DUEs.

The resource reservation signal, the D2D data and the discovery signal are multiplexed by the physical channel multiplexing unit 203. The D2D signal transmitted by use of the L band is transmitted from the antenna 26A via the L band transmitter 210A. The D2D signal transmitted by use of the U band is transmitted from the antenna 26B via the U band transmitter 210B.

The U band D2D signal received by the antenna 26B is converted into the baseband signal by the receiver 211B and sent to the physical channel separating unit 224. Further, the L band D2D signal received by the antenna 26A is converted into the baseband signal by the receiver 211A and sent to the physical channel separating unit 224.

The physical channel separating unit 224 separates the physical channel. At this time, the discovery signal is detected by a detecting unit (D2D discovery Signal Detector) 226 and treated as the data. The D2D data is demodulated and decoded by a demodulating unit (D2D discovery Signal Demodulator) 225. When the D2D data contains the SA (L+U), the D2D scheduler 217 performs the scheduling for receiving the D2D data.

Note that the RF circuit 24A operates as the L band transmitter 210A and receiver 211A. The RF circuit 24B operates as the U band transmitter 210B and receiver 211B. The data 201, the control signal 204, the reference signal 206 and the synchronization signal 207 are generated on the memory 22 or the LSI 23. The LSI 23 operates as the channel encoder 202, the channel encoder 205, the physical channel multiplexing unit 203, the IFFT 208A, the IFFT 208B, the CP adding unit 209A, the CP adding unit 209B, the demodulating unit 212A and the demodulating unit 212B.

Moreover, the LSI 23 operates as the D2D scheduler 217, the resource reservation generating unit 218, the D2D data generating unit 219, the discovery signal generating unit 220, the D2D discovery signal detecting unit 226 and the D2D data signal demodulating unit 225.

The CPU 21 operates as the measuring unit 213, the PDSCH decoder 214, the carrier sensing unit 215 and the SA generating unit 216. However, a part or the whole of the function blocks executed by the LSI 23 may be configured to be executed by the CPU 21. Conversely, the functions executed by the CPU 21 may be configured to be executed by the LSI 23.

Second Embodiment

Figure 9:
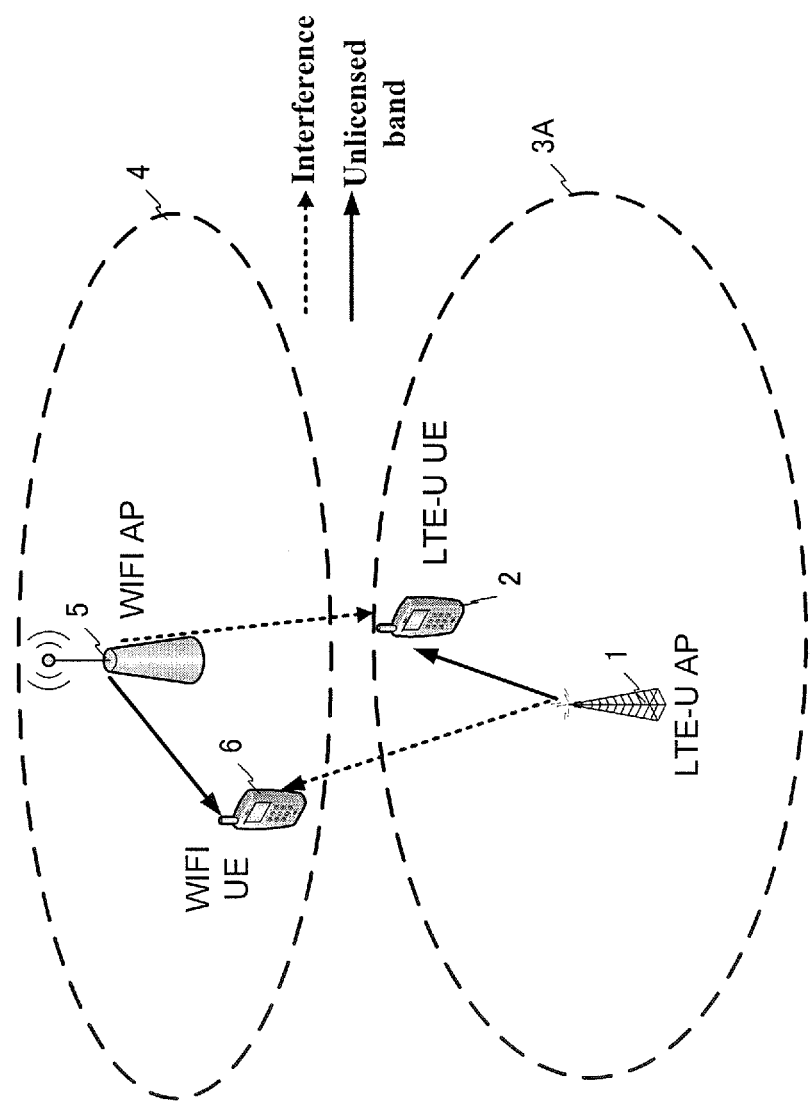
FIG. 9 is a diagram illustrating an example of a configuration of a wireless communication system according to a second embodiment.

Next, a second embodiment will be described. FIG. 9 is a diagram illustrating an example of a configuration of a wireless communication system according to a second embodiment. In FIG. 9, the base station (LTE-U AP) 1 is the base station described in the first embodiment and may conduct the transmission using the L band (LTE frequency band) and the U band (WiFi frequency band). The base station 1 is the LTE base station being operable as an access point (AP) of the U band.

The base station 1 may transmit the data and the control signal by using the U band to the subordinate UE (LTE-U UE) 2 in the coverage area (cell) 3A of the U band. A WiFi access point (AP 5) exists in the vicinity of the coverage area 3A in some cases. The AP 5 may transmit the data and the control signal to the WiFi user equipment (WiFi UE) 6 in a range of a coverage area 4. The coverage area 3A and the coverage area 4 embrace an overlapped area as the case may be.

Such a case is assumed that the base station 1 transmits the signal of the U band (the WiFi frequency band) to the subordinate UE 2 existing in the coverage area 3A. Supposing at this time that the frequency of the U band signal (unlicensed sub-band) directed to the UE 2 is the same as the frequency of the signal to be transmitted from the AP 5, the U band signal becomes an interference wave with the terminal 6 located in the coverage area 4 of the AP 5 as the case may be. Such a situation is considered to easily occur when the UE 2 is located at an edge of the cover portion 3A. Conversely, the signal directed to the terminal 6 from the AP 5 becomes the interference wave with the UE 2 receiving the signal of the U band from the base station 1 as the case may be.

The situation described above may occur in the following case. In the U band scheduling carried out by the base station 1, as a result of performing the U band carrier sensing, a certain unlicensed sub-band is determined to be in the idle status, and the base station 1 determines that this sub-band is used.

In fact, however, though the AP 5 transmits the data to the terminal 6 by using a certain sub-band, the radio wave from the AP 5 does not reach the base station 1, and consequently the sub-band is determined to be in the idle status by the base station 1. This causes the interference. The second embodiment will discuss a technology enabling the aforementioned interference to be avoided.

Figure 10:
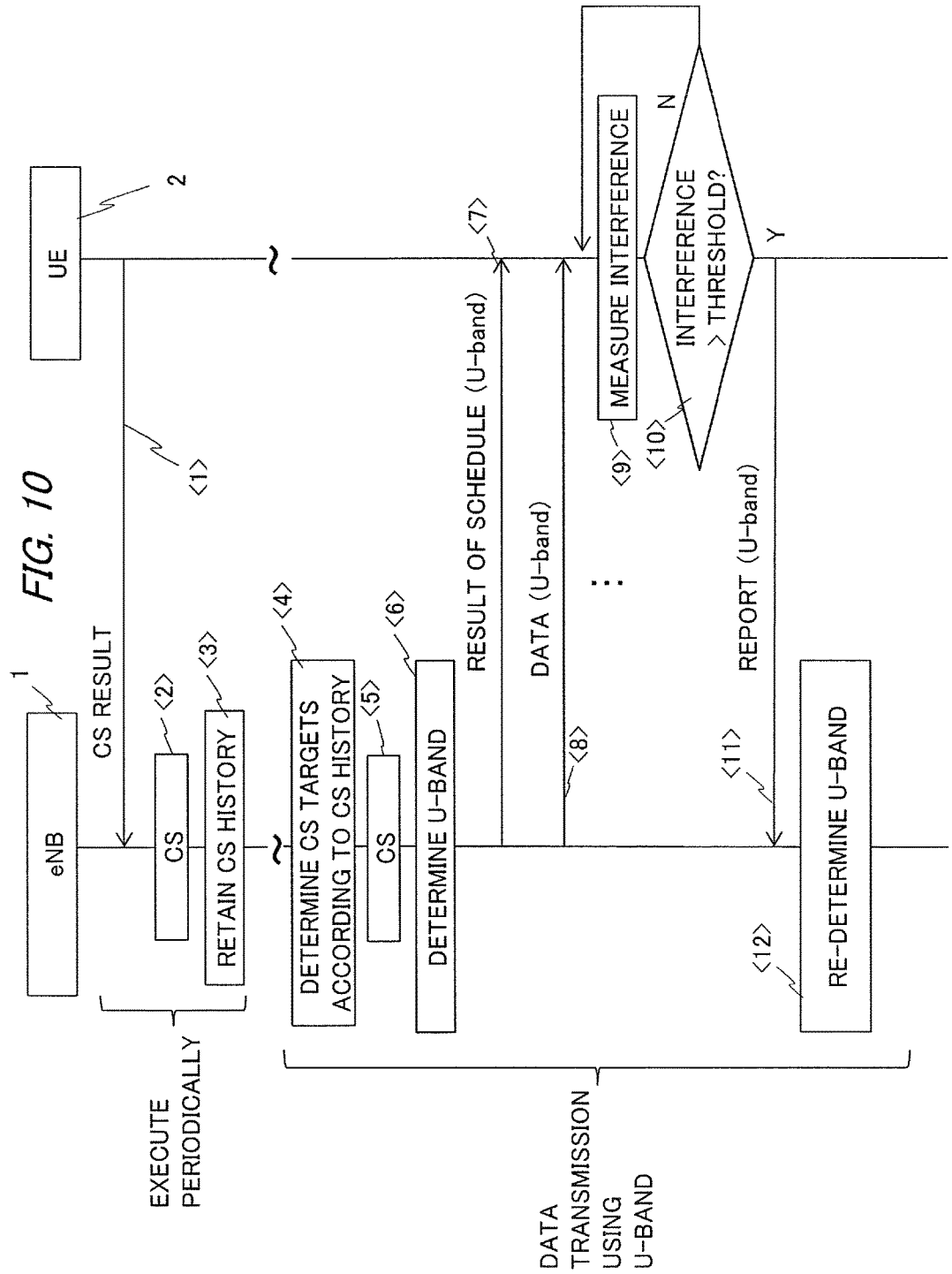
FIG. 10 is a sequence diagram illustrating one example of operations in the second embodiment.

FIG. 10 is a sequence diagram illustrating operations in the second embodiment. In FIG. 10, the UE 2 performs the carrier sensing for the U band and transmits the carrier sensing result (CS result) to the base station (eNB) 1 (<1> in FIG. 10).

Next, the base station 1 performs the carrier sensing for the U band (<2> in FIG. 10). Subsequently, the base station 1 saves the historic carrier sensing results containing the carrier sensing result given from the UE 2 and the carrier sensing result of the base station 1 itself (<3> in FIG. 10).

The processes in <1> through <3> are, e.g., periodically executed. It is, however, feasible to properly set the frequency range to perform the carrier sensing, a length of interval and a trigger to perform the carrier sensing.

Thereafter, the base station 1, when transmitting the data to the UE 2 by using the U band, refers to the historic carrier sensing results, and thus determines the unlicensed sub-bands (U band candidates) becoming the carrier sensing target (<4> in FIG. 10).

Next, the base station 1 performs the carrier sensing (CS) for the U band candidates (<5> in FIG. 10), and determines that the unlicensed sub-bands determined to be in the idle status are used (<6> in FIG. 10: determination of U band). It is also, however, possible to determine the use of the unlicensed sub-bands selected from the historic carrier sensing results without performing the carrier sensing.

Subsequently, the base station 1 implements the scheduling using the unlicensed sub-bands with the use being determined as the radio resources (the frequency and the time), and transmits the scheduling result to the UE 2 (<7> in FIG. 10). Thereafter, the base station 1 transmits the data to the UE 2 by using the unlicensed radio resources (<8> in FIG. 10).

The UE 2 measures, as triggered by receiving the scheduling result, the interference with respect to the unlicensed sub-bands with the use being determined (<9> in FIG. 10). Whatever existing methods may be applied to an interference measuring method.

The UE 2 determines whether a measurement value of the interference exceeds a predetermined threshold value (<10> in FIG. 10), and transmits a report indicating an excess over the threshold value to the base station 1 when the interference exceeds the threshold value (<11> in FIG. 10).

The base station 1 receiving the report redetermines the U band (the unlicensed sub-bands used for transmitting the data). In the redetermination, the base station may determine the use of different unlicensed sub-bands by using the historic carrier sensing results. Alternatively, in the carrier sensing result of the UE 1, it is possible to determine the use of other unlicensed sub-bands taking the idle status.

Figure 11:
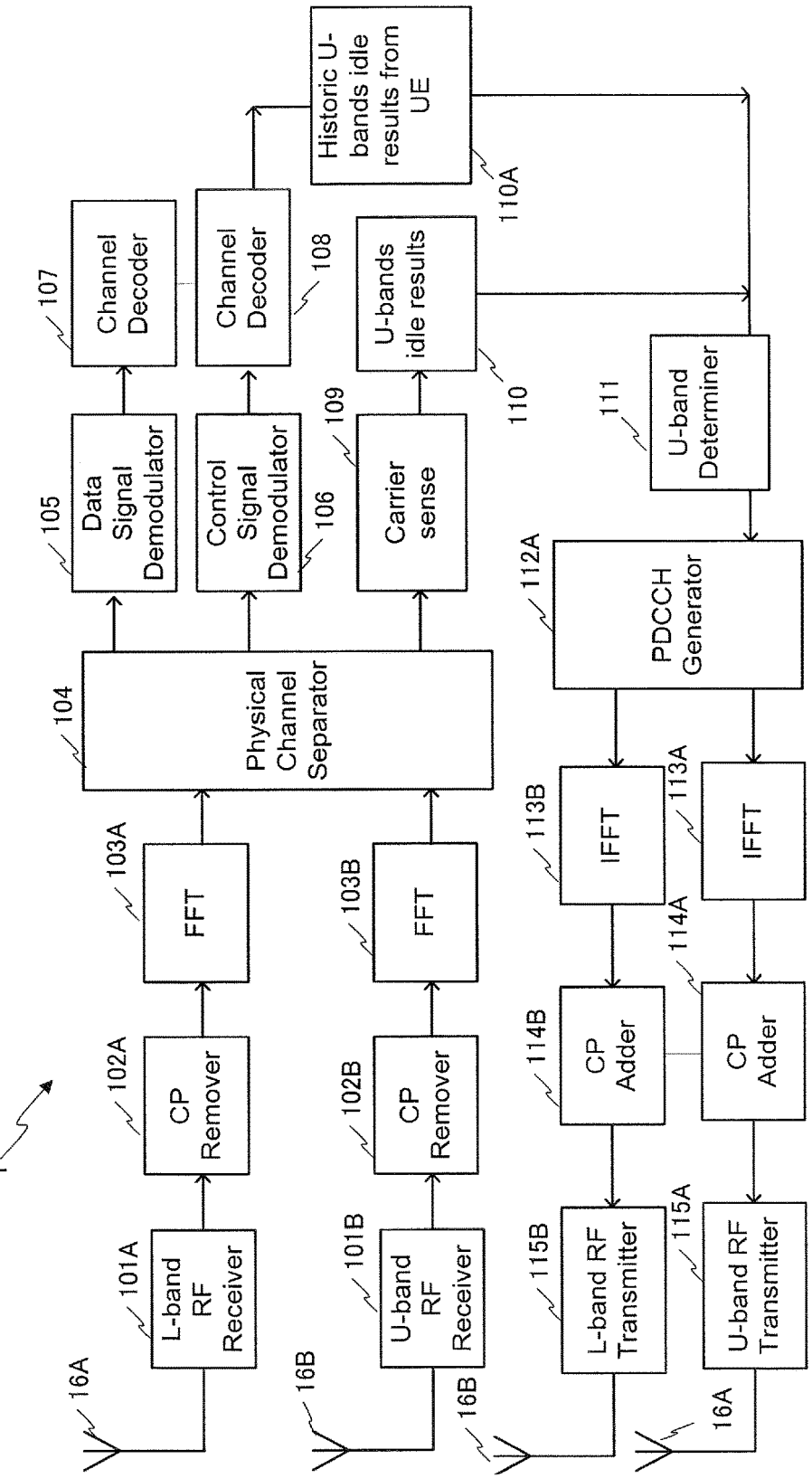
FIG. 11 is a diagram schematically illustrating functions of the base station in the second embodiment.

The hardware configurations illustrated respectively in FIGS. 5 and 7 may be applied as the hardware configurations of the base station 1 and the UE 2 in the second embodiment. FIG. 11 is a diagram schematically illustrating functions of the base station 1 in the second embodiment. The functions of the base station 1 depicted in FIG. 11 are different from those in the first embodiment (FIG. 6) in terms of the following points.

In a block 110A (Historic U-bands idle results from UE), the carrier sensing result transmitted from the UE 2 may be obtained as a control channel decoding result. The carrier sensing result is stored in the memory 12. Further, the carrier sensing unit 109 performs the carrier sensing for the U band of the base station 1 itself, and the history processing unit 110 may obtain the carrier sensing result (the unlicensed sub-bands in the idle status) of the base station 1. The history processing unit stores the carrier sensing result of the base station 1 in the memory 12.

The U band determining unit 111 determines the U band candidates by using the historic carrier sensing results containing the carrier sensing result of the base station 1 and the carrier sensing result of the UE 2 (<4> in FIG. 10). The same method as that in the first embodiment (the method of selecting the sub-band exhibiting 100% as the idle rate) may be applied to a method of determining the U band candidates. Upon determining the U band candidates, the U band determining unit 111 performs the carrier sensing for the U band candidates by use of the carrier sensing unit 109 and the history processing unit 110 (<5> in FIG. 10), and obtains the information indicating the unlicensed sub-bands determined to be in the idle status. Then, the U band determining unit 111 determines a corresponding number of unlicensed sub-bands (taking idle status) to the data size transmitted to the UE 2, to be used for transmitting the data. Thus, the unlicensed sub-bands used for transmitting the data may be determined (<6> in FIG. 10).

The generating unit 112A maps the data stored in the memory 12 and directed to the UE 2 to the channel format for the U band, thereby generating the baseband signal directed to the UE 2. Thereafter, the baseband signal is inverse-Fourier-transformed by the IFFT 113B, attached with the CP by the CP adding unit 114B, converted into the radio signal by the transmitter 115B and transmitted from the antenna 16B.

Furthermore, in the block 110A, the report that the interference value exceeds the threshold value, may be obtained as the control channel decoding result. At this time, the U band determining unit 111 determines, based on, e.g., the historic carrier sensing results, the use of the unlicensed sub-bands different from the sub-bands being in use at the present, and notifies the UE 2 of a re-scheduling result.

Note functions or operations of other blocks illustrated in FIG. 11 are the same as those in the first embodiment, and hence the descriptions thereof are omitted. The CPU 11 of the base station 1 in the second embodiment may operate as the block 110A, the history processing unit 110, the U band determining unit 111 and the carrier sensing unit 109.

However, a part of the whole of these functions may be modified to be executed by the LSI 13.

Figure 12:
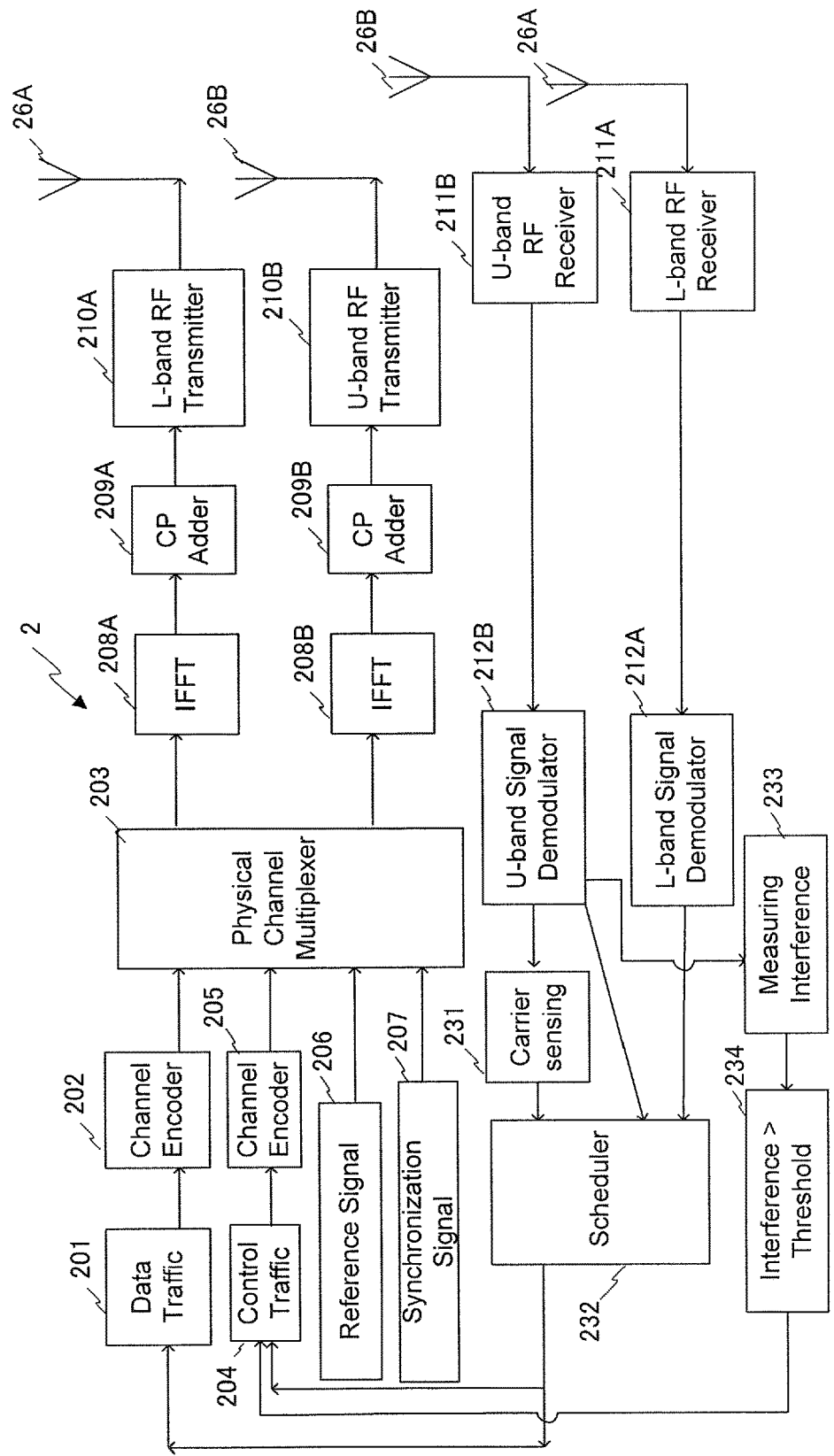
FIG. 12 is a diagram schematically illustrating functions of the UE in the second embodiment.

FIG. 12 is a diagram schematically illustrating the functions of the UE 2 in the second embodiment. the functions of the UE 2 depicted in FIG. 12 are different from those in the first embodiment (FIG. 8) in terms of the following points. Namely, in a block 231 (Carrier sensing), the carrier sensing for the sub-bands of the U band is performed. The carrier sensing result (CS result) is treated as the control signal 204 and transmitted to the base station 1.

Moreover, in the U band demodulating unit 212B, when the scheduling result (the allocation result of the unlicensed sub-bands) is obtained as a U band signal demodulating result from the base station 1, the block 232 (Scheduler) performs scheduling for receiving the data from the base station 1. Further, in the demodulating unit 212B, the data is received as the U band signal demodulating result, during which the block 233 (Measuring Interference) measures the interference value, and the block 234 determines whether the interference value exceeds the threshold value. When exceeding the threshold value, a report indicating this purport is treated as the control signal and transmitted to the base station 1.

Functions of other blocks depicted in FIG. 12 are the same as those in the first embodiment (FIG. 8), and hence the explanations thereof are omitted. Note that the CPU 21 of the UE 2 in the second embodiment executes processes of the blocks 231, 232, 233 and 234. However, a part or the whole of these processes may be modified to be executed by the LSI 23.

According to the second embodiment, the unlicensed sub-bands used for the U band transmission are determined by using the historic carrier sensing results for the U bands of the UE 2 and the base station 1. The data transmission is thereby carried out by use of the sub-bands with a high possibility of not being used by the AP 5. The data transmission from the base station 1 may be thereby avoided from interfering with the WiFi terminal 6. Furthermore, the interference of the signal coming from the AP 5 of WiFi may be avoided when the base station 1 transmits the data to the UE 2.

Moreover, the UE 2 measures the interference value when receiving the data from the base station 1 and reports, when the interference value exceeds the threshold value, this purport to the base station 1. The unlicensed sub-bands used for transmitting the data are thereby changed. Along with this change, the interference disappears or is reduced.

According to the embodiments, it is feasible to avoid the interference with the data transmission using the unlicensed frequencies. The configurations of the embodiments described above may be properly combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station, comprising:
    a storage device configured to store results of carrier sensing performed respectively by a transmission terminal and a reception terminal to perform device-to-device communications with a plurality of sub-bands in unlicensed frequencies being frequencies of which a use is not licensed for data transmission; and
    a controller configured to extract at least one or more sub-bands of the unlicensed frequencies being determined that are in an idle status or have a high possibility to be in the idle status by both of the transmission terminal and the reception terminal in the carrier sensing results as candidates for sub-bands of the unlicensed frequencies that the transmission terminal uses in data transmission with the device-to-device communications,
    wherein the controller is configured to transmit an allocation result of radio resources using licensed frequencies of which a use for the data transmission is licensed and candidates for the unlicensed frequencies to the transmission terminal and the reception terminal when device-to-device communications using the licensed frequencies is performed in addition to the device-to-device communications using the sub-bands in the unlicensed frequencies.

2. The base station according to claim 1, wherein the controller is configured to transmit a signal configured to integrate the allocation result of the radio resources using the licensed frequencies and the candidates for the unlicensed frequencies to the transmission terminal and the reception terminal.

3. A transmission terminal to transmit data to a reception terminal with device-to-device communications, the transmission terminal comprising:
    a controller configured to execute, when transmitting data with device-to-device communications using licensed frequencies as frequencies of which a use is licensed for data transmission and at least one or more sub-bands in unlicensed frequencies of which a use is not licensed for the data transmission to a reception terminal, a process of:
    receiving an allocation result of radio resources using the licensed frequencies and candidates for sub-bands of the unlicensed frequencies determined that are in an idle status or have high possibility to be in an idle status by both of the transmission terminal and the reception terminal from a base station;
    determining the sub-bands of the unlicensed frequencies used for the data transmission by carrier sensing for the candidates for the sub-bands of the unlicensed frequencies; and
    transmitting the allocation result of the radio resources using the licensed frequencies and an allocation result of the radio resources using the determined sub-bands of the unlicensed frequencies to the reception terminal.

4. The transmission terminal according to claim 3, wherein the controller is configured to transmit a signal configured to integrate an allocation result of the radio resources using the licensed frequencies and an allocation result of the radio sources using the determined sub-bands of the unlicensed frequencies to the reception terminal.

5. The transmission terminal according to claim 3, wherein the controller is configured to execute a process of reserving the sub-bands of the unlicensed frequencies when determining the sub-bands of the unlicensed frequencies used for the data transmission.

6. A method for controlling device-to-device communication, the method comprising:
    storing, using the base station, results of carrier sensing performed respectively by a transmission terminal and a reception terminal to perform device-to-device communications with respect to at least one or more sub-bands in unlicensed frequencies being the frequencies of which a use is not licensed for data transmission; and extracting, using the base station, at least one or more sub-bands of the unlicensed frequencies being determined that are in an idle status or have high possibility to be the idle status by both of the transmission terminal and the reception terminal in the carrier sensing results as candidates for sub-bands of the unlicensed frequencies to be used for the transmission terminal to transmit data with the device-to-device communications, transmitting, using the base station, an allocation result of radio resources using licensed frequencies of which a use for the data transmission is licensed and candidates for the unlicensed frequencies to the transmission terminal and the reception terminal when device-to-device communications using the licensed frequencies is performed in addition to the device-to-device communications using the sub-bands in the unlicensed frequencies.

7. A method for controlling device-to-device communication, the method comprising:

when transmitting data with device-to-device communications using licensed frequencies being frequencies of which a use is licensed for data transmission and sub-bands in unlicensed frequencies of which a use is not licensed for the data transmission to a reception terminal, receiving, using the transmission terminal, an allocation result of radio resources using the licensed frequencies and candidates for sub-bands of the unlicensed frequencies being determined that are in an idle status or have high possibility to be in the idle status by both of the transmission terminal and the reception terminal from a base station;

determining, using the transmission terminal, sub-bands of the unlicensed frequencies used for the data transmission by carrier sensing for the candidates for the sub-bands of the unlicensed frequencies; and transmitting, using the transmission terminal, the allocation result of the radio resources using the licensed frequencies and an allocation result of the radio resources using the determined sub-bands of the unlicensed frequencies to the reception terminal.

8. A method for controlling transmission, the method comprising:

storing, using a base station, results of carrier sensing performed respectively by the base station and by a terminal with respect to at least one or more sub-bands in unlicensed frequencies being the frequencies of which a use is not licensed for transmitting data to the terminal;

extracting, using the base station, at least one or more sub-bands in the unlicensed frequencies determined that are in an idle status or have high possibility to be in the idle status by both of the base station and the terminal in the carrier sensing results as candidates for sub-bands of the unlicensed frequencies used for the base station to transmit the data to the terminal;

determining, using the base station, the sub-bands of the unlicensed frequencies used for the data transmission by the carrier sensing for the candidates for the sub-bands of the unlicensed frequencies; and transmitting, using the base station, the allocation result of the radio sources using the determined sub-bands of the unlicensed frequencies to the terminal, transmitting, using the base station, an allocation result of radio resources using licensed frequencies of which a use for the data transmission is licensed and candidates for the unlicensed frequencies to the transmission terminal and the reception terminal when device-to-device communications using the licensed frequencies is performed in addition to the device-to-device communications using the sub-bands in the unlicensed frequencies.

* * * * *